United States Patent [19]

Spoon

[11] Patent Number: 5,423,506
[45] Date of Patent: Jun. 13, 1995

[54] RECREATIONAL VEHICLE AWNING SUPPORT

[75] Inventor: Vito Spoon, Roslindale, Mass.

[73] Assignee: Recreation Vehicle Products, Inc., Wichita, Kans.

[21] Appl. No.: 65,584

[22] Filed: May 24, 1993

[51] Int. Cl.⁶ .................. E04F 15/08; E04F 10/06
[52] U.S. Cl. .................... 248/273; 296/163; 135/88.1; 160/67; 242/595
[58] Field of Search .............. 296/163; 135/89; 160/46, 52, DIG. 5, 67, 69; 248/284, 273, 291, 292.1, 293, 316.5, 903; 242/73.5

[56] References Cited

U.S. PATENT DOCUMENTS

| | | | |
|---|---|---|---|
| 2,220,311 | 11/1940 | Anton | 242/73.5 |
| 2,706,132 | 4/1955 | Chaffin | 296/163 |
| 3,980,121 | 9/1976 | McKee | 135/89 X |
| 4,160,458 | 7/1979 | Marcellus | 135/89 |
| 4,640,332 | 2/1987 | Turner | 160/46 |
| 4,653,716 | 3/1987 | Sakaguchi | 248/316.5 |
| 4,727,897 | 3/1988 | Watts | 135/89 |

OTHER PUBLICATIONS

"RV News", Dec. 1992, vol. 18, No. 5, front and inside back cover of magazine.

Primary Examiner—Dennis H. Pedder
Attorney, Agent, or Firm—Shook, Hardy & Bacon

[57] ABSTRACT

A support for an awning of a recreational vehicle, the awning being operable to unroll to a usable position and to be compactly retracted adjacent a side of the recreational vehicle in a storage position. The support comprises a bracket adapted to be secured to the recreational vehicle. The bracket comprises at least one retention member which extends angularly upward away from the side of the recreational vehicle. The support further comprises an awning-receiving apparatus which is movably mounted to the bracket between a supporting position in which the receiving apparatus engages the retention member, thereby supporting and maintaining the retracted awning in the storage position, and an inoperative position in which the awning is unrolled and the receiving apparatus does not engage the retention member.

21 Claims, 2 Drawing Sheets

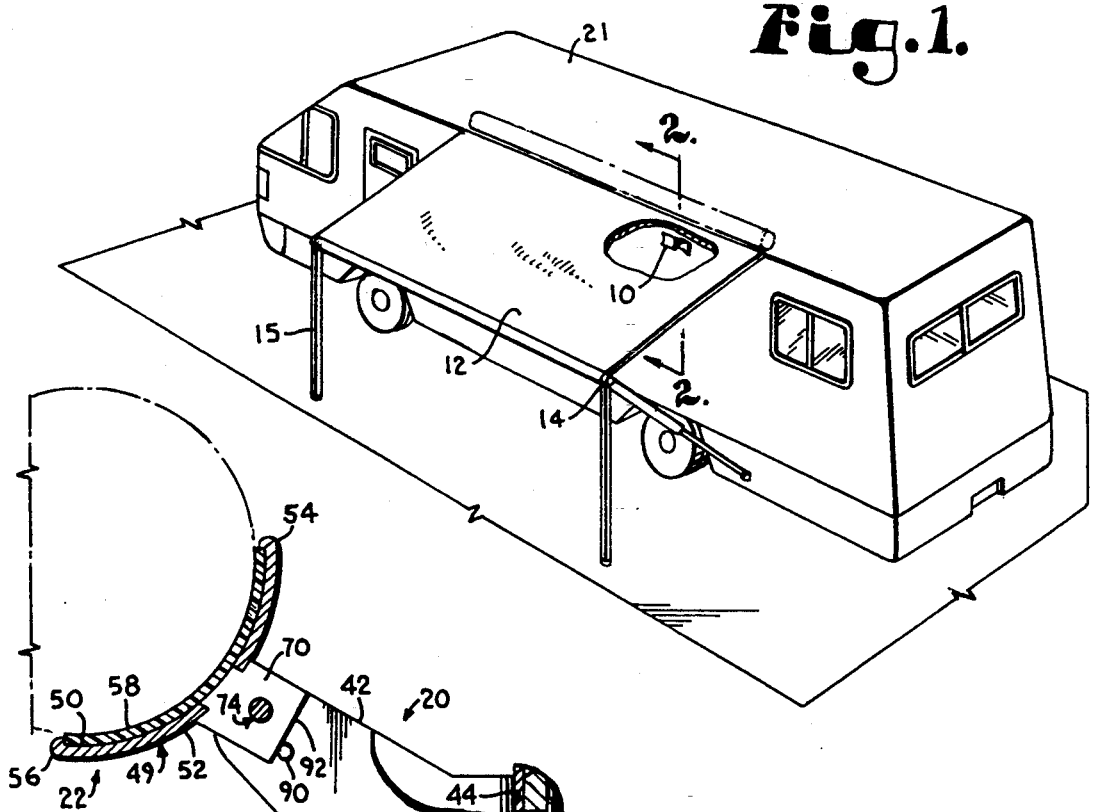
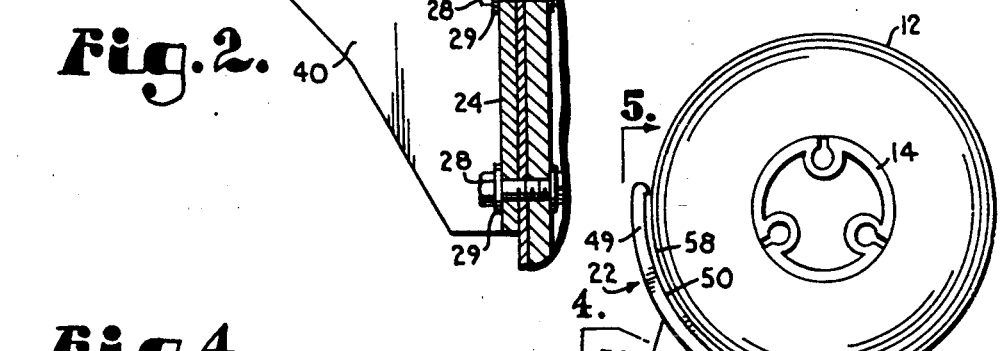
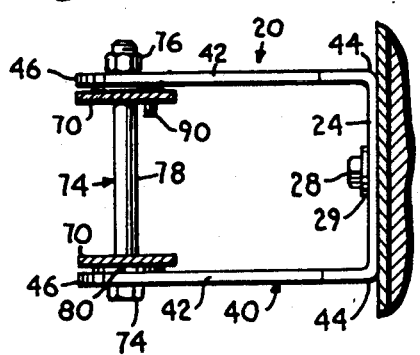
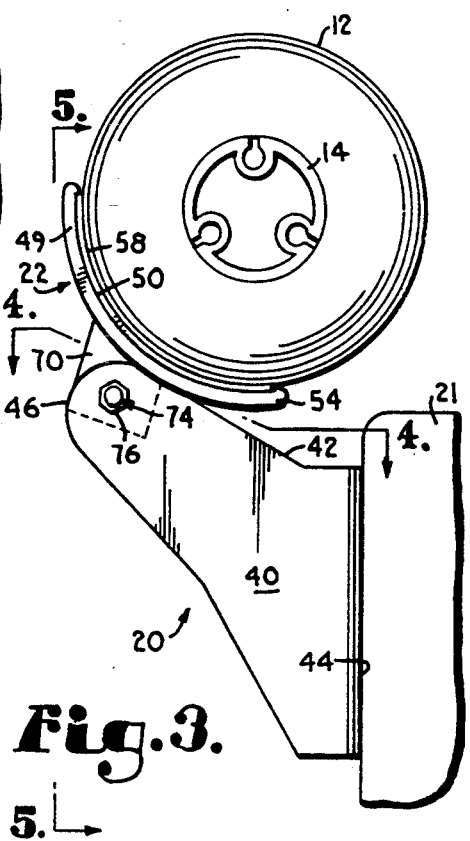

RECREATIONAL VEHICLE AWNING SUPPORT

FIELD OF THE INVENTION

This invention relates to attachments for recreational vehicles and, in particular, to an awning support for releasably supporting and maintaining the awning of a recreational vehicle in a rolled up storage position adjacent to the side thereof.

BACKGROUND OF THE INVENTION

Recreational vehicles have long been a popular means of vacationing. They are typically equipped with essential home amenities, such as cooking, sleeping, and rest room facilities. As such, travelers employ recreational vehicles to camp and tour various locations without the need to arrange for hotel or resort accommodations.

Awnings are another popular feature for recreational vehicles. The awnings are typically maintained on a roll which attaches to the side of the recreational vehicle and which allows the recreational vehicle owner thereof to unroll the awning to a usable position to provide shelter from the elements, such as rain and sun. The recreational vehicle owner can easily roll the awning back to the storage position adjacent the side of the recreational vehicle prior to traveling in the recreational vehicle, or when the awning is otherwise not needed. Thus, a retractable awning, as described above, is a desirable feature for recreational vehicle owners.

To maintain the recreational vehicle awning in the storage position rolled up adjacent the side of the recreational vehicle, a retaining apparatus or retention bracket is required. Prior brackets and retaining apparatuses have proven cumbersome. Some brackets rigidly secure the rolled awning to the side of the recreational vehicle, but, nevertheless, make it difficult or complicated to release the rolled awning to the usable position. Prior apparatuses which provide for easy transition between the rolled and unrolled positions have turned out to ineffectively maintain the awning in the stored position. In such cases, the roller bar was initially closed to the storage position and then these apparatuses were manually adjusted and/or positioned and adjusted up to the roller bar, thus supporting the roller bar in the storage and travel position.

OBJECTS AND SUMMARY OF THE INVENTION

It is, therefore, a primary object of this invention to provide an awning support which securely supports and maintains the awning of a recreational vehicle in a rolled up storage position.

Another important object is to provide a support which allows the user to unroll the stored awning to an operative position without difficulty. A further object is to provide a support which allows the user to readily roll the awning from the operative position back to the storage position, and the action of rolling the awning to the rolled up storage will securely support and maintain the roller bar in that position. An additional object is to provide a support that does not tear, scrape, or otherwise damage the awning when the awning is moved between the storage and operative positions.

Yet another object is to produce an inexpensive support constructed with strong, weatherproof materials. A related object is to construct the support with a minimal number of moving and interacting parts to minimize breakdown and maintenance.

To accomplish these and other related objects of the invention, an awning support is disclosed for supporting and securely maintaining the awning of a recreational vehicle in a storage position in which the awning is maintained for travel. The awning support comprises a bracket adapted to secure to the vehicle. The bracket includes at least one retention member which extends angularly upward away from the side of the vehicle, and has upper and lower surfaces. The awning support further comprises an awning-receiving apparatus for releasably supporting and securing the retracted awning. The receiving apparatus is movably mounted to the bracket between a supporting position in which the receiving apparatus rests upon the upper surface of the retention member, supporting the rolled up awning in the storage position, and an inoperative or nonsupporting position in which the awning is unrolled and the receiving apparatus does not rest upon the upper surface of the retention member. The angularly disposed upper surface of the retention member engages the receiving apparatus and securely maintains the apparatus in the storage position.

In the preferred embodiment, the awning-receiving apparatus comprises a semicylindrical supporting surface having an edge proximal to the side of the vehicle and a distal edge thereto. The awning-receiving apparatus is pivotally connected to that end of the retention member which is located distally from the side of the vehicle. When the awning support is in the supporting position, the awning-receiving apparatus pivots upwardly and rests on the upper surface of the retention member, and the proximal edge of the receiving apparatus is disposed in a lower horizontal plane than the distal edge, thereby securing the rolled or retracted awning in the storage position. When the awning-receiving apparatus is in the inoperative position, the distal edge of the receiving apparatus is disposed in a lower horizontal plane than the proximal edge, and the distal edge is disposed to receive the awning roll when the awning is retracted from the usable to the storage position.

Thus, the present invention overcomes the problems heretofore experienced by recreational vehicle owners. The present invention discloses an inexpensive awning support which securely supports an awning of a recreational vehicle in a storage position, and yet is adapted to readily release the retracted awning to an operative position.

BRIEF DESCRIPTION OF THE DRAWINGS

In the accompanying drawings which form a part of the specification and are to be read in conjunction therewith, and in which like reference numerals are used to indicate like parts and the various views:

FIG. 1 is a perspective view of a recreational vehicle having an awning extended to a usable position;

FIG. 2 is a fragmentary, sectional view taken generally along the plane of line 2—2 in the direction of the arrows showing the awning support attached to the recreational vehicle and showing the support in the inoperative position in which the awning roll is not supported on the awning support;

FIG. 3 is a side elevational view similar to that of FIG. 2 except that the awning support is in the supporting position in which the awning is rolled up adjacent the side of the recreational vehicle;

FIG. 4 is a top plan view taken generally along the plane of line 4—4 in FIG. 3 in the direction of the arrows showing the pivotal connection of the awning-receiving apparatus to the support bracket;

DETAILED DESCRIPTION OF THE PREFERRED EMBODIMENT

Figure 5:
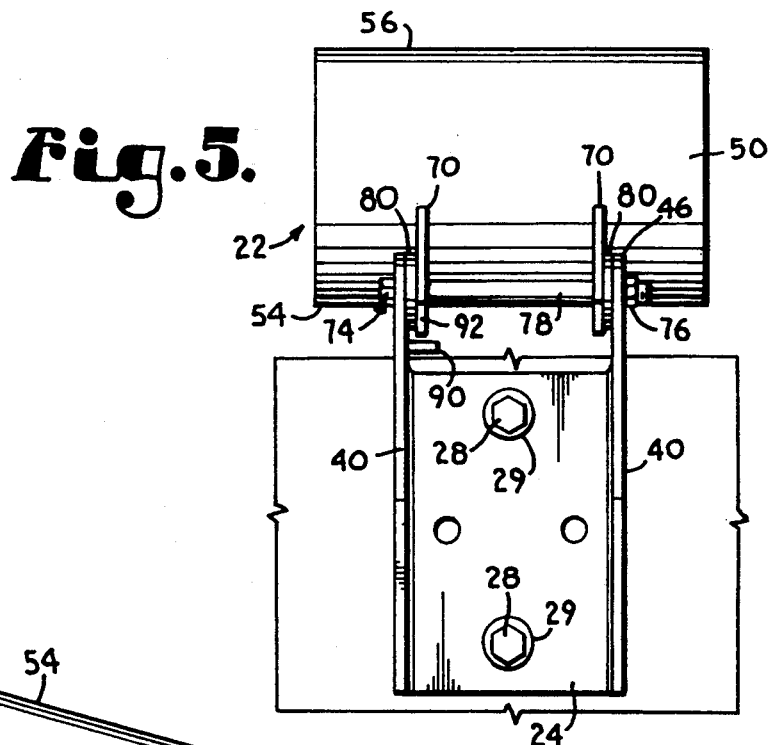
FIG. 5 is an elevational view taken generally along the plane of line 5—5 in FIG. 3 in the direction of the arrows.

Turning now to the drawings in greater detail, and initially to FIG. 1, numeral 10 generally designates the awning support of the present invention. The awning support 10 is adapted to support and securely maintain the awning 12 wrapped around roll bar 14 in a storage position (See FIG. 3). The awning support allows the awning to be released from roll bar 14 to a usable position (See FIGS. 1-2) in which the awning is supported by retractable poles 15.

The awning support 10 generally comprises a bracket 20 which is adapted to secure the awning support 10 to the recreational vehicle 21. The awning support 10 further comprises an awning-receiving apparatus 22 which is pivotally connected to the bracket 20 between a supporting position (See FIG. 3) in which the awning 12 is in the storage position and an inoperative position (See FIGS. 1-2) in which the awning 12 is in the usable position.

Figure 6:
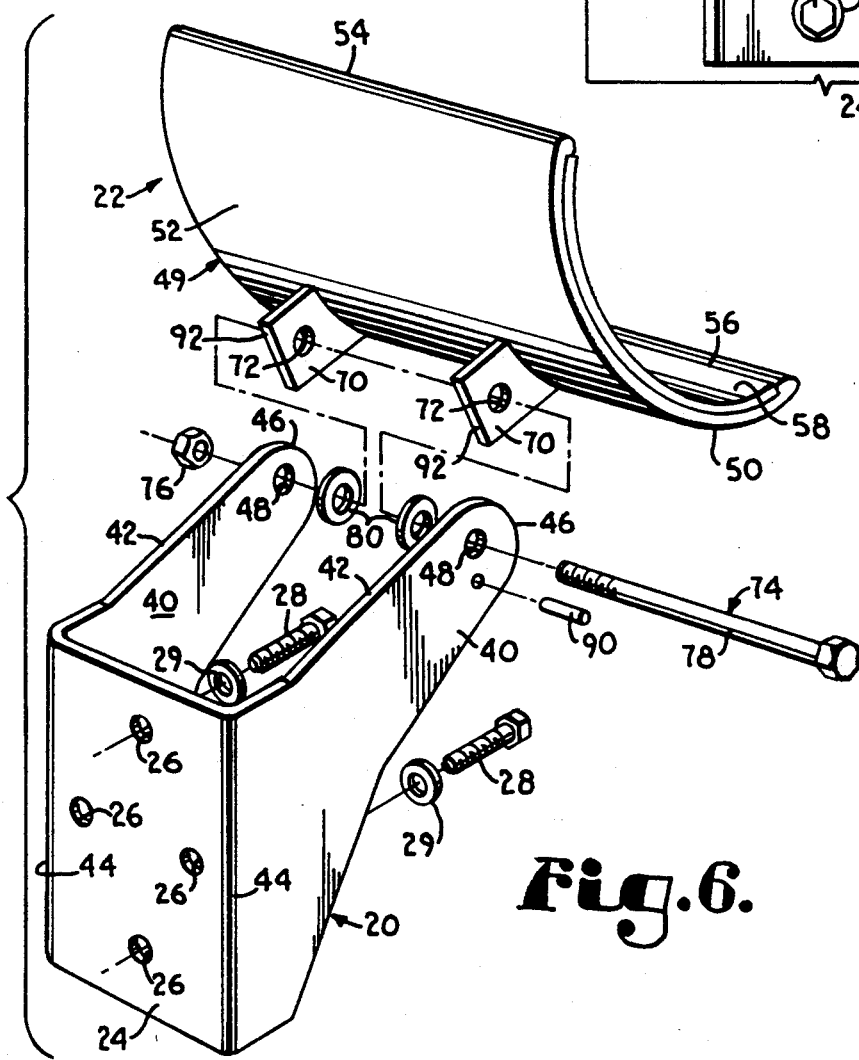
FIG. 6 is an exploded perspective view of the pivotal connection of the awning-receiving apparatus to the support bracket.

The bracket 20 comprises a mounting plate 24 having screw holes 26 adapted to receive screws 28 and washers 29, or the like, to rigidly secure the awning support 10 to the side of the vehicle 21 (shown best in FIG. 6). The bracket 20 further comprises a retention means for engaging the awning-receiving apparatus 22 to support and maintain the awning-receiving apparatus 22 in the supporting position and thus, support the awning 12 in the storage position. In the preferred embodiment, the retention means comprises at least two arms 40 spaced substantially parallel apart. The arms 40 are rigidly attached to the mounting plate 24 and are preferably formed integrally therewith. The arms 40 have upper surfaces 42 which extend angularly upward away from the proximal ends 44, which are secured to the mounting plate 24, toward distal ends 46. The distal ends 46 have holes 48 adapted to provide a pivotal connection between the awning receiving apparatus 22 and bracket 20, as will be described below. It should be understood that a wider, single retention arm could be used. However, using at least two retention arms spaced apart, such as arms 40, provides greater stability.

The awning-receiving apparatus 22 preferably comprises a semicylindrical collar 49 having a semi-cylindrical supporting surface 50 and a lower surface 52 for engaging the angled upper surfaces 42 of retention arms 40 when the awning-receiving apparatus 22 is in the supporting position, thereby maintaining the rolled awning 12 in the storage position. The semicylindrical collar 49 also includes an edge 54 located proximally to the side of the recreational vehicle 21, and a distal edge 56. In the preferred embodiment, the supporting surface 50 of the awning-receiving apparatus 22 includes a buffer means, such as padding 58, to prevent damage to the awning 12 when the awning 12 is in the storage position, or when the awning 12 is moved between the inoperative and usable positions.

Plates 70 are secured in spaced parallel relation to the lower surface 52 of the awning-receiving apparatus 22 generally along the transverse center line of surface 52 and extend generally perpendicularly therefrom. The plates 70 are secured to the lower surface 52 by known means, such as welding. Referring to FIG. 6, holes 72 are formed therein for receiving bolt 74. Bolt 74 is received through holes 48 of retention arms 40 and holes 72 of plates 70, and is secured thereto by nut 76. The plates 70, and thus the awning-receiving apparatus 22, are thereby pivotally connected about bolt 74 to bracket 20 between the supporting and inoperative positions. The bolt 74 preferably has a smooth rod portion 78 to facilitate pivoting of the awning-receiving apparatus 22 about the bolt 74. When the semicylindrical collar 49 is in the supporting position, the proximal edge 54 is disposed in a lower horizontal plane than the distal edge 56. When the semicylindrical collar 49 is in the inoperative position, the distal edge 56 is disposed in a lower horizontal plane than the proximal edge 54.

The awning support 10 further comprises a stop means, such as pin 90, which engages the bottom surface 92 of plates 70 to limit the pivotal movement of the awning-receiving apparatus 22 away from the side of the vehicle, thereby maintaining the distal edge 56 of awning-receiving apparatus 22 in a position disposed to receive the awning 12 when such is moved from the usable to the storage positions. The pin 90 can be formed integrally with an arm 40 of bracket 20, or it could be received through a hole 91 and secured therein by known means (refer to FIG. 6).

The awning-receiving apparatus 22, the bracket 20, and the retention arms 40 are preferably made from a durable weather-resistant material, such as aluminum or a durable plastic. Also, plastic washers 80 are preferably placed between the plates 70 and the retention arms 40, as shown in FIG. 5, to prevent scraping of the metal surfaces when the awning-receiving apparatus 22 pivots between the supporting and inoperative positions.

OPERATION

When the awning 12 is retracted into the storage position, as shown in FIG. 3, and it is desired that the awning 12 be moved to the usable position, the awning 12 must be pulled away from the side of the vehicle with sufficient outward force to cause the awning-receiving apparatus 22 to pivot up and over upwardly angled upper surfaces 42 of retention arms 40. The awning-receiving apparatus 22 will then pivot until the bottom surface 92 of plate 70 engages the pin 90, thereby preventing further pivotal movement of the awning-receiving apparatus 22 away from the side of the vehicle. Thereafter, the awning 12 may be unrolled to the usable position, as shown in FIG. 1, and poles 15, or the like, may be used to support the ends 102 of the awning, as is well-understood in the art.

With the awning-receiving apparatus 22 in the inoperative position, the distal edge 56 is disposed to receive the rolled up awning 12. To return the awning 12 to the storage position, the awning 12 must be retracted by rolling the same upon roll bar 14 toward the storage position, whereby the awning-receiving apparatus 22 will automatically pivot to the supporting position in which the lower surface 52 engages upper surfaces 42 of retention arms 40, thereby supporting and maintaining the retracted awning 12 in the storage position.

From the foregoing, it will be seen that this invention is one well-adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments made be made of the invention without departing from the scope thereof, it is to be understood that all matter herein set forth or shown in the accompanying drawings is to be interpreted as illustrative and not in a limiting sense.

Having thus described the invention, what is claimed is:

1. An awning support for selectively supporting and deploying a retractable awning, the support comprising:
   a bracket comprising a mounting member and at least one retention member extending angularly away from the mounting member, said retention member having an upper surface; and
   an awning-receiving means for releasably supporting and securing the retracted awning, the receiving means being selectively movably mounted to the retention member of the bracket between a supporting position in which the receiving means engages the upper surface of the retention member thereby supporting and maintaining the retracted awning in a stored position, and a nonsupporting position in which the receiving means does not rest upon the upper surface of the retention member and the awning is extended to a deployed position.

2. The awning support of claim 1 wherein the retention member is secured to the mounting member at a proximal end of the retention member and extends angularly away from the mounting member toward a distal end of the retention member.

3. The awning support of claim 2 wherein the awning-receiving means is pivotally connected to the retention member at the distal end of the member.

4. The awning support of claim 3 wherein the pivotal connection between the awning-receiving means and the retention member is spaced from the mounting member so that the retracted awning is adjacent the mounting member when the awning-receiving means is in the supporting position and the awning is in the stored position.

5. The awning support of claim 4 wherein the awning-receiving means comprises a semicylindrical supporting surface having an edge proximal said mounting member and an edge distal thereto.

6. The awning support of claim 5 wherein the distal edge of the semicylindrical supporting surface is disposed to receive the awning when the awning-receiving means is in the nonsupporting position and the awning is being moved from the deployed position to the stored position.

7. The awning support of claim 5 wherein the distal edge of the semicylindrical supporting surface is disposed in a lower horizontal plane than the proximal edge when the awning-receiving means is in the nonsupporting position and the distal edge is disposed in a higher horizontal plane than the proximal edge when the awning-receiving means is in the supporting position.

8. The awning support of claim 7 wherein the semicylindrical supporting surface includes buffer means to prevent damage to the awning when the awning is in the stored position and when the awning is being moved between the stored and deployed positions.

9. The awning support of claim 8 including a stop on the retention member at a location to contact the awning-receiving means to maintain the awning-receiving means in the nonsupporting position.

10. An awning support for selectively supporting and deploying a retractable awning, the support comprising:
    a bracket comprising mounting means for rigidly mounting to a support surface and at least one rigidly affixed retention member extending angularly away from said mounting means;
    a substantially rigid awning-receiving means for releasably supporting the retractable awning, the receiving means being pivotally mounted to the retention member between a supporting position, wherein the awning-receiving means securely maintains and supports the retracted awning in a stored position, and a nonsupporting position, wherein the awning-receiving means permits the awning to be extended to a deployed position; and
    stop means on the retention member for contacting the awning-receiving means to maintain the awning-receiving means in the nonsupporting position.

11. The awning support of claim 10 wherein the retention member has an upper surface that extends angularly away from said mounting means and wherein the awning-receiving means pivots between the supporting position in which the awning-receiving means engages the upper surface of the retention member, and the nonsupporting position in which the awning-receiving means does not rest upon the upper surface of the retention member.

12. The awning support of claim 11 wherein the bracket includes a second retention member spaced substantially parallel apart from the first mentioned retention member.

13. The awning support of claim 12 wherein each said retention member includes a proximal end secured to said mounting means and a distal end, the awning-receiving means being pivotally connected to the retention members at the distal ends of the retention members.

14. The awning support of claim 13 wherein the pivotal connection between the awning-receiving means and each retention member is spaced from the mounting means so that the retracted awning is adjacent the mounting means when the awning-receiving means is in the supporting position and the awning is in the stored position.

15. The awning support of claim 10 wherein the awning-receiving means comprises a semicylindrical supporting surface having an edge proximal the mounting means and a distal edge.

16. The awning support of claim 15 wherein the distal edge of the semicylindrical support surface is disposed to receive the awning when the awning-receiving means is in the nonsupporting position and the awning is moved from the deployed position to the stored position.

17. The awning support of claim 16 wherein the distal edge of the semicylindrical support surface is disposed in a lower horizontal plane than the proximal edge of the semicylindrical support surface when the awning-receiving means is in the nonsupporting position and wherein the distal edge of the semicylindrical support surface is disposed in a higher horizontal plane than the proximal edge of the semicylindrical support surface when the awning-receiving means is in the supporting position.

18. The awning support of claim 17 wherein the semicylindrical supporting surface includes buffer means to prevent damage to the awning when the awning is in the stored position and when the awning is moved between the stored and deployed positions.

19. An awning support adapted to be selectively moved between a supporting position, wherein the support holds a retracted awning, and a nonsupporting position, wherein said awning is deployed, the support comprising:
- a bracket comprising at least one mounting plate and at least one retention member rigidly secured to the mounting plate and extending angularly away from the mounting plate; and
- a rigid semicylindrical support member having an edge proximal said mounting plate and an edge distal thereto, the support member being pivotally connected to the retention member for movement between a supporting position, wherein the proximal edge is disposed in a horizontal plane below the distal edge, and a nonsupporting position, wherein the proximal edge is disposed in a horizontal plane above the distal edge.

20. The support of claim 19 wherein the distal edge of the semicylindrical support member is disposed to receive the awning roll when the semicylindrical support member is in the nonsupporting position.

21. An awning support adapted to be selectively moved between a supporting position, wherein said support holds a retracted awning, and a nonsupporting position, wherein said awning is deployed, the support comprising:
- a bracket comprising at least one mounting plate and at least one retention member rigidly secured to the mounting plate and extending angularly away from the mounting plate; and
- a rigid support member having an arcuate surface and having an edge proximal said mounting plate and an edge distal thereto, the support member being pivotally coupled to the retention member for movement between a supporting position in which the proximal edge is disposed in a horizontal plane below the distal edge, and a nonsupporting position in which the proximal edge is disposed in a horizontal plane above the distal edge of the support member.

* * * * *